United States Patent
Moll et al.

(10) Patent No.: US 12,055,840 B2
(45) Date of Patent: Aug. 6, 2024

(54) CAMERA APPARATUS FOR GENERATING AN IMAGE REPRESENTATION OF A SURROUND AND HEADLIGHT ARRANGEMENT

(71) Applicant: AUDI AG, Ingolstadt (DE)

(72) Inventors: Tobias Moll, Ingolstadt (DE); Markus Klug, Munich (DE); Johannes Scheuchenpflug, Baar-Ebenhausen (DE)

(73) Assignee: AUDI AG, Ingolstadt (DE)

( * ) Notice: Subject to any disclaimer, the term of this patent is extended or adjusted under 35 U.S.C. 154(b) by 47 days.

(21) Appl. No.: 17/926,039

(22) PCT Filed: Apr. 20, 2021

(86) PCT No.: PCT/EP2021/060465
§ 371 (c)(1),
(2) Date: Nov. 17, 2022

(87) PCT Pub. No.: WO2021/233639
PCT Pub. Date: Nov. 25, 2021

(65) Prior Publication Data
US 2023/0185165 A1 Jun. 15, 2023

(30) Foreign Application Priority Data
May 19, 2020 (DE) .................. 10 2020 113 579.3

(51) Int. Cl.
*G03B 15/05* (2021.01)
*B60Q 1/00* (2006.01)
(Continued)

(52) U.S. Cl.
CPC ........... *G03B 15/05* (2013.01); *B60Q 1/0023* (2013.01); *G02B 5/32* (2013.01); *G02B 6/4214* (2013.01);
(Continued)

(58) Field of Classification Search
CPC .............. G02B 27/1006; G02B 27/106; G02B 27/126; G02B 27/0037; G02B 6/4214;
(Continued)

(56) References Cited

U.S. PATENT DOCUMENTS 9,606,354 B2 * 3/2017 Spitzer ..................... G02B 5/30
9,753,141 B2 * 9/2017 Grauer ..................... G01S 17/18
(Continued)

FOREIGN PATENT DOCUMENTS

| DE | 60319238 T2 | 2/2009 |
| EP | 1168007 B1 | 10/2005 |
| WO | WO2020/225123 A1 | 11/2020 |

OTHER PUBLICATIONS

First German Examination Report, dated Jan. 18, 2021, in corresponding German Patent Application No. 10 2020 113 579.3 (4 pp.).
(Continued)

*Primary Examiner* — Pritham D Prabhakher
(74) *Attorney, Agent, or Firm* — STAAS & HALSEY LLP

(57) ABSTRACT

A camera apparatus records only those objects in a surround which are situated in a predetermined object plane at a distance from the camera apparatus. To this end, the camera apparatus includes an illumination device for illuminating the desired object with an illumination light and an image capture device (for capturing the illumination light reflected by the object. For recording that is dependent on the object plane, the camera apparatus additionally comprises a control device for driving the illumination device to provide the illumination light in the form of light pulses and for controlling the image capture device to capture the reflected illumination light within recording intervals assigned to the light pulses. To avoid interference effects on a resultant image representation, provision is additionally made for a
(Continued)

deflection unit for deflecting the respective illumination light between the surround and the illumination device and the image capture device.

20 Claims, 2 Drawing Sheets

(51) Int. Cl.
  *G02B 5/32* (2006.01)
  *G02B 6/42* (2006.01)
  *H04N 23/55* (2023.01)
(52) U.S. Cl.
  CPC ........... *G02B 6/4259* (2013.01); *H04N 23/55* (2023.01); *G02B 2207/101* (2013.01); *G03B 2215/0567* (2013.01); *G03B 2217/002* (2013.01)
(58) Field of Classification Search
  CPC .. G02B 6/4259; G02B 5/32; G02B 2207/101; G02B 2215/0582; G02B 2215/0567; G02B 2217/002; H04N 23/56; H04N 23/55; G01S 17/894; B60Q 1/0023; G03B 15/05
  USPC .......................................................... 348/371
  See application file for complete search history.

(56) References Cited

U.S. PATENT DOCUMENTS

| | | | | |
|---|---|---|---|---|
| 10,025,160 | B2* | 7/2018 | Park | G02B 6/0051 |
| 10,890,707 | B2* | 1/2021 | Waldern | G01B 11/2513 |
| 11,204,425 | B2* | 12/2021 | Mano | G01S 17/89 |
| 11,841,481 | B2* | 12/2023 | Sinay | G06T 19/006 |
| 2012/0249797 | A1 | 10/2012 | Haddick et al. | |
| 2015/0177591 | A1* | 6/2015 | Sugiyama | G02B 27/0093 359/298 |
| 2015/0293645 | A1 | 10/2015 | Zhou et al. | |
| 2015/0326570 | A1* | 11/2015 | Publicover | G06V 40/197 382/117 |
| 2016/0018639 | A1* | 1/2016 | Spitzer | G02B 27/0103 359/13 |
| 2016/0041390 | A1* | 2/2016 | Poon | G02B 5/3083 359/489.08 |
| 2017/0115395 | A1 | 4/2017 | Grauer | |
| 2018/0321496 | A1* | 11/2018 | Bohn | G09G 3/003 |
| 2019/0025432 | A1 | 1/2019 | Mano | |
| 2019/0086674 | A1 | 3/2019 | Sinay et al. | |
| 2019/0129085 | A1* | 5/2019 | Waldern | G02B 6/0036 |
| 2020/0159030 | A1* | 5/2020 | Ayres | G02B 27/0179 |

OTHER PUBLICATIONS

Second German Examination Report, dated Oct. 6, 2022, in corresponding German Patent Application No. 10 2020 113 579.3 (5 pp.).
International Preliminary Report on Patentability, dated Dec. 1, 2022, in corresponding International Application No. PCT/EP2021/060465 (16 pp.).
International Search Report, dated Aug. 11, 2021, in corresponding International Application No. PCT/EP2021/060465 (5 pp.).
Written Opinion of the International Searching Authority, dated Nov. 25, 2021, in corresponding International Application No. PCT/EP2021/060465 (6 pp.).
PCT/EP2021/060465, Apr. 22, 2021, Tobias Moll et al., AUDI AG Ingolstadt, Germany.
10 2020 113 579.3, May 19, 2020, Tobias Moll et al., AUDI AG Ingolstadt, Germany.

* cited by examiner

CAMERA APPARATUS FOR GENERATING AN IMAGE REPRESENTATION OF A SURROUND AND HEADLIGHT ARRANGEMENT

CROSS REFERENCE TO RELATED APPLICATIONS

This application is a U.S. national stage of International Application No. PCT/EP2021/060465, filed on Apr. 22, 2021. The International Application claims the priority benefit of German Application No. 10 2020 113 579.3 filed on May 19, 2020. Both the International Application and the German Application are incorporated by reference herein in their entirety.

BACKGROUND

The invention relates to a camera apparatus for generating or capturing at least one image representation of at least one object in an environment (or surround or surrounding). The invention also relates to a headlight arrangement for a motor vehicle, which includes a headlight light source and the camera apparatus.

In the invention, it is in particular about capturing an image representation of a certain or desired object in the environment. Thereto, it is provided that the desired object is illuminated with a predetermined illumination light by an illumination device, which can be captured upon reflection on the object by an image capture device, such as for example a photo camera or video camera, by an image sensor. The image sensor can convert the impinging light into an image signal in known manner. Subsequently, the image signal can be composed or reconstructed to the desired image representation of the object of the environment with suitable processing by a display device such as for example a display.

The camera apparatus is configured as a so-called "holocam". Therefore, holographic-optical elements (HOE) are used to transfer the illumination light provided by the illumination device to the desired object on the one hand and to redirect the illumination light reflected on the object to the image capture device on the other hand. Thus, the image capture device and the illumination device do not have to be situated in an optical axis with the object to be recorded in the environment.

In order to realize the above mentioned "holocam", the camera apparatus includes a light guiding medium, which includes a first deflection element and a second deflection element. For example, the light guiding medium can be configured as a plate or pane of glass or plastic. The first and the second deflection element are arranged spaced from each other along a longitudinal extension direction of the light guiding medium. Therein, the deflection function or light directing function of the camera apparatus is provided by the first and the second deflection element. Therefore, the first and the second deflection element are realized as diffractive optical elements and/or the above mentioned holographic-optical elements, for example as a volume hologram. The light guiding medium is configured to transfer or forward light, which has been coupled into the light guiding medium at a corresponding angle by the first and/or second deflection element, between the first and the second deflection element by internal reflection, in particular total reflection. The transferable light is the above mentioned illumination light. In order to provide the illumination light via the light guiding medium for illuminating the object in the environment, the camera apparatus thus also includes the illumination device, which is configured to provide the illumination light to the second deflection element. The second deflection element is now configured to couple the illumination light into the light guiding medium for transferring to the first deflection element. The first deflection element is correspondingly configured to again couple the illumination light transferred in the light guiding medium by the internal reflection for illuminating the object out of the light guiding medium. In order to generate the image representation of the respective object in the environment, the camera apparatus also includes the above mentioned image capture device. Now, in order to transfer the illumination light reflected on the respective object in turn from the object to the image capture device, the first deflection element is configured to again couple the reflected illumination light into the light guiding medium for transferring to the second deflection element. Correspondingly, the second deflection element is configured to again couple the illumination light transferred in the light guiding medium by the internal reflection out of the light guiding medium for transferring to the image capture device.

Thus, the mentioned deflection elements are configured for bidirectionally redirecting or deflecting the illumination light. Therefore, each of the deflection elements can both couple the (reflected) illumination light into the light guiding medium and couple the (reflected) illumination light out of the light guiding medium.

An example for a configuration of a "holocam" is known from DE 10 2017 217 193 A1. Herein, the "holocam" is used as a so-called head-up display in a vehicle. Therein, in a transparent partial region of a vehicle pane, a volume hologram is arranged as a holographic foil with at least two optical elements for redirecting light. Therein, light from the environment is coupled into the pane by means of the optical elements and redirected towards a camera on the one hand. The camera can then generate an image signal from the incident light, which is provided to a projector. It generates projection light from the image signal. The projection light is again coupled into the pane via the optical elements and subsequently coupled out for display for a driver of the vehicle for presenting an image representation of the environment on the pane.

Herein, a purposeful illumination of the desired object in the environment thus is not provided.

Instead of a holographic-optical element for redirecting light, a lens can for example also be used, as disclosed in US 2009/0153712 A1. Via the lens, illumination light can be output from an illumination unit to the environment on the one hand and the reflected illumination light can be provided from the environment to a camera on the other hand. However, the disadvantage of such a lens is in that the manufacture, in particular grinding the lens, is mostly expensive.

Therefore, it is advantageous to use the above mentioned holographic-optical elements for redirecting the illumination light instead of a lens. A corresponding system is for example known from US 2019/0086674 A1. Here, a head-mounted display is described, which uses a "holocam" to display a desired display image to a wearer of the head-mounted display depending on a viewing direction of the wearer. Therein, corresponding holographic-optical elements are used to couple infrared light into and again out of a light guiding medium for providing to the eye of the user for viewing direction detection. The light reflected on the eye can then again be coupled into the light guiding medium and out to a camera via the holographic-optical elements to determine the viewing direction. Depending on the viewing direction, a projector can then be controlled, which generates a desired display image in the form of a projection light. Therein, the projection light is redirected from the projector to the wearer by means of the holographic-optical elements for displaying.

However, herein, undesired interference effects can occur in redirecting the infrared light during the viewing direction recognition. For example, the interference effects can be interfering lights like an environmental light or a reflection of the infrared light for example on glasses of the wearer of the head-mounted display. Thereby, overexposure of the image sensor of the camera can occur such that the viewing direction determination can no longer be reliably effected.

SUMMARY

It is an aspect of the present invention to develop the previously described camera apparatus such that only one or more predetermined objects in the environment are specifically captured, and to avoid interference effects on the resulting image representation.

Therein, an aspect of the invention is based on the realization that with a permanent or continuous illumination of the environment (or surround or surroundings), the illumination light is always reflected on multiple objects, which are situated in different object planes or sectional planes of the environment. Therefore, the illumination light is reflected from depth planes at different distances from the camera apparatus. Thus, a specific illumination and capture of an individual object in the environment is not possible. Therein, with object plane within the meaning of the invention, a plane in the space is in particular meant, which is respectively oriented parallel to a sensor plane of an image sensor of the image capture device. Therein, the environment to be captured by the camera apparatus usually includes multiple such sectional planes, which are arranged one after the other at different distances to the camera apparatus from the view of the camera apparatus. Now, in that the image capture device also additionally continuously captures the reflected illumination light from the environment, thus, an image representation of the environment usually results, on which a plurality of objects in different sectional planes is represented. Now, it is the aspect of the invention to specifically provide the illumination light to each one of these sectional planes to illuminate and thus to capture only one object, which is situated in the respective sectional plane. In contrast, objects, which are situated in sectional planes different from the desired one, are not to be captured and thus are to be masked out or not represented on the resulting image representation.

In order to realize this, it is provided that the previously described camera apparatus additionally includes a control device, which is configured to operate the illumination device and the image capture device in a predetermined switching operation. Therefore, the illumination device and the image capture device each have an enabled switching state and a disabled switching state. Therein, in the enabled or activated state, the image capture device is configured to capture the reflected illumination light. In contrast, in the disabled or deactivated state, capture of the illumination light is not effected. Correspondingly, in the activated or enabled state, the illumination device is configured to provide the illumination light, while the illumination light is not provided by the illumination device in the disabled or deactivated state. According to the switching operation, the control device is now configured to switch the image capture device and the illumination device, for example according to a predetermined switching pattern, from the enabled switching state into the disabled switching state and vice versa. The switching operation, that is for example the switching pattern, can in particular be determined by the expert. Therein, the switching operation can be adjusted depending on the distance of the sectional plane to the camera apparatus.

However, the switching operation is therein selected such that the illumination device and the image capture device are set into the enabled or activated switching state for providing the illumination light and for capturing the reflected illumination light offset in time to each other, that is in particular spaced in time one after the other. Thus, a predetermined or fixedly defined illumination interval, within which the illumination device provides the illumination light, and a predetermined or fixedly defined recording interval, within which the image capture device captures the reflected environmental light, are offset in time from each other. Therein, the illumination and the recording interval are delimited from each other by a predetermined pause interval. Therein, the pause interval represents a period of time, in which the illumination device and the image capture device are switched into the deactivated state at the same time. Thus, either the illumination of the object or the capture of the reflected illumination light is effected.

Thereby, the illumination device quasi provides the illumination light in defined illumination pulses to the environment and the image capture device captures only that portion of the illumination light, which is reflected to the image capture device within the recording interval. This procedure can also be referred to as so-called "gated imaging". Therein, a respective duration of the illumination interval and the recording interval can be selected depending on a distance of the sectional plane or the object in the desired sectional plane to the camera apparatus.

Thus, the advantage arises that only one object, which is situated in the predetermined sectional plane, is represented on the resulting image representation with a predetermined brightness value and/or in highlighted manner. In contrast, the remaining environment, thus objects, which are situated in other sectional planes, are masked out, thus not represented. In that objects, which are situated in sectional planes different from the desired one, are masked out or not represented, in particular results from the temporally limited recording window or recording interval. Besides the temporally matched recording time, the inverse square law with respect to the light decay in particular also helps. Thereby, the above mentioned interference effects can also be avoided in the resulting image representation.

The control device can also be configured to determine a distance of the imaged object in the environment based on the duration or length of the pause interval. The control device can calculate the distance in known manner depending on a predetermined propagation speed of the illumination light in the light guiding medium and the environment.

In the following, the above mentioned switching operation is now first described in more detail. Thereto, in an example of the invention, the control device is configured to increase or reduce the pause interval between the activated state of the illumination device and the activated state of the image capture device according to a predetermined switching criterion with each switching procedure in the switching operation. Therein, only the pause intervals are in particular increased or reduced, which are delimited or determined by the disable point of time of the illumination device and the directly following enable point of time of the image capture device. Therein, with switching procedure within the meaning of the invention, a switching cycle is meant, which includes an illumination interval followed by a pause interval and a final recording interval.

By varying the pause interval, thus, objects can be recorded in different sectional planes and thus different distances from the camera apparatus. By increasing the pause interval, thus, objects in increasingly farther distance from the camera apparatus can be recorded. In contrast, by reducing, objects in increasingly closer distance from the camera apparatus can be recorded. Thus, a plurality of or multiple image representations of the environment can be captured by the camera apparatus, in which an object, which is situated in a different sectional plane of the environment, is respectively represented. A layered recording of the environment can quasi be effected. Subsequently, the resulting image representations can for example be composed to a three-dimensional image representation of the environment.

According to the switching criterion, it can for example be provided that the variation of the pause interval is for example performed until reaching a predetermined maximum limit value, thus for example a maximum duration of the pause interval, or until reaching a predetermined minimum limit value, that is a minimum duration of the pause interval. Alternatively, the switching criterion can also be limited by a predetermined number of captured image representations.

In order to be able to operate the image capture device in the switching operation, various variants are disclosed in the following. In a variant of an example of the invention, it is provided that the image capture device includes a mechanically movable closure element for switching between the activated or capturing or recording state and the deactivated or non-capturing or non-recording state. The closure element can also be referred to as so-called "shutter". Therein, the control device can for example control an electrically controllable closure mechanism of the closure element such that the closure element is closed to set the image capture device into the deactivated state, and the closure element is opened to set the image capture device into the activated state.

In a further variant of the example of the invention, the image capture device includes an electrically switchable layer, which is in particular configured as a foil layer. It is attached in front of the image sensor from direction of light incidence of the image capture device. In order to switch the image capture device, the control device is now configured to for example provide a predetermined electrical voltage to the foil layer. Depending on whether or not the electrical voltage is applied to the foil layer, the foil layer can therein be switched either in a transparent (translucent) or opaque (non-translucent) state. Thereby, the impingement of the reflected illumination light on the image sensor can be avoided. The foil layer can for example be configured as an OLED (Organic Light Emitting Diode) or LCD foil or electrochromic foil layer.

In a further example of the invention, it is provided that the illumination device and the image capture device are arranged at a predetermined distance from each other in a transfer region of the light guiding medium configured by the second deflection element. Therein, the illumination device and the image capture device can directly abut on the light guiding medium. Therein, the first and the second deflection element are configured to compensate for the distance between the image capture device and the illumination device. Thus, shadow casting or shading in emitting the illumination light to the object and reflection of the illumination light on the object can be avoided in the resulting image representation. How exactly the compensation for the distance can function, is again described in more detail in the later course in context of the configuration of the first and the second deflection element.

The illumination light is monochromatic light. In a further example of the invention, it is correspondingly provided that the illumination device includes a laser light source for providing the illumination light. Thereby, a high-energy and in particular narrow-band illumination light, in the form of laser light, can in particular be provided by the illumination device. The laser light source can for example be realized by at least one semiconductor laser diode and/or a laser configured in known manner. Additionally or alternatively, the illumination light can also be provided by a LED light source with one or more light emitting diodes (LED) respectively with or without a corresponding light filter.

In a further example of the invention, it is provided that the illumination device is configured to generate illumination light in the infrared frequency range. Therefore, the illumination device can in particular provide illumination light with a wavelength between 780 nanometers and one millimeter. Thereby, the illumination light is in particular outside of the light spectrum visible to the human.

Now, possibilities of configuration of the deflection elements are described in more detail in the following. Namely, the deflection elements are configured as diffractive optical elements (DOE). In an example of the invention, it is in particular provided that the first and the second deflection element are configured as optical gratings, in particular as surface holographic gratings (surface hologram) or volume holographic gratings (volume hologram).

An optical grating, also termed diffraction grating, as well as the mode of operation and production method thereof is generally known. Basically, an optical grating can be realized by incorporating one or more structures periodical at least in sections, so-called grating structures or deflection structures, in a substrate. By the grating structure, the optical grating can induce a light guidance by the physical effect of diffraction as it is for example known from mirrors, lenses or prisms. If light is incident, that is if light beams are incident, on the optical grating, wherein the incident light beams in particular satisfy the Bragg equation, the light beams are diffracted or deflected by the optical grating. Thus, the light guidance can in particular be effected by interference phenomena of the light beams diffracted by the optical grating. Therein, a diffraction angle, at which the light is deflected or redirected, is in particular determined by the configuration of the grating structure (grating characteristics) such as for example a grating pitch.

The production of the optical grating can in particular be effected by exposure of the substrate, thus for example in photolithographic or holographic manner. In this context, the optical grating can then also be referred to as holographic or holographic-optical grating. Thus, the deflection elements are configured as holographic-optical elements. Usually, two types of holographic-optical gratings are known: surface holographic gratings (briefly SHG) and volume holographic gratings (briefly VHG). In the surface holographic gratings, the grating structure can be generated by optically deforming a surface structure of the substrate. Examples for surface holographic gratings are so-called sawtooth or blaze gratings. In contrast thereto, the grating structure can be incorporated in the entire volume or a partial region of the volume of the substrate in volume holographic gratings.

As a material for the said substrate for incorporating the optical grating, a polymer or plastic is particularly suitable, in particular a photopolymer or a foil, in particular a photosensitive foil, for example of plastic or organic materials. Alternatively, glass can also be used as the substrate. The light guiding medium itself can be configured as the substrate for incorporating the respective optical grating. Thus, the deflection elements are configured integrally with the light guiding medium. Thus, the first and the second deflection element can for example be directly incorporated on a surface structure of the light guiding medium. Therefore, the deflection structure can for example be etched or lasered into the surface or a volume of the light guiding medium. Thus, the light guiding medium itself can be configured as the above mentioned HOE. Alternatively, the light guiding medium can also be configured as a separate element to the first and the second deflection element. For example, the first and the second deflection element can be configured in different sections of a holographic foil or plate, which is attached to the light guiding medium. For attaching, the foil or plate can for example be adhered to the light guiding medium. Alternatively, the holographic foil can also be configured as an adhesive foil and directly, thus without adhesive, adhere to the surface of the light guiding medium by molecular forces.

In addition, the deflection elements are also configured wavelength-selective or frequency-selective. Thus, only light, in particular a first portion of the light, with a predetermined wavelength can be deflected or diffracted by the deflection element at a predetermined diffraction angle. Light, in particular a second portion of the light, with a length different from the predetermined one is not deflected or the less the greater the difference to the predetermined wavelength. Thus, the second light portion, which deviates from the predetermined wavelength or optimum wavelength, can propagate through the substrate with the deflection element in unimpeded manner. Advantageously, this deflection effect is maximum for the optimum wavelength and declines towards longer and shorter wavelengths, for example according to a Gaussian bell, or becomes weaker. Presently, the respective deflection element can thus be configured wavelength-selective or frequency-selective only with respect to the illumination light provided by the illumination device. Thus, it can be avoided that for example light from the environment like the above mentioned interfering lights is coupled into the light guiding medium at all and provided to the image capture device for generating the image representation.

Particularly, the deflection elements are additionally configured direction-selective or angle-selective. Therein, the direction selectivity in particular relates to a predetermined diffraction angle, at which the respective deflection element deflects the impinging light from its direction of incidence. Therefore, the light, which impinges on the deflection element, is deflected into a predetermined deflection direction from its direction of incidence. The angle, which appears between the direction of incidence and the deflection direction, is referred to as the diffraction angle. Advantageously, this deflection effect is maximum for the predetermined deflection direction and declines towards deviating deflection directions, for example according to a Gaussian bell, or becomes weaker. Thereby, a slight expansion of the illumination light in deflecting by the deflection elements can also occur.

Additionally or alternatively, the direction selectivity can also relate to the direction of incidence of the light on the deflection element. Therefore, only light, in particular a portion of the light, which is incident on the respective deflection element from a predetermined direction of incidence or optimum direction, thus for example at a predetermined angle of incidence, can be deflected at a diffraction angle predetermined to the direction of incidence. Light, in particular a portion of the light, which is incident on the respective deflection element from another than the optimum direction, is not deflected or the less the greater the difference to the predetermined direction of incidence. Thus, the light portion, which deviates from the optimum direction, can propagate through the light guiding medium in unimpeded manner. Advantageously, this deflection effect is maximum for the optimum direction and declines towards more acute or obtuse angles of incidence, for example according to a Gaussian bell, or becomes weaker.

Advantageously, the deflection elements can also each include more than one optical grating, for example two optical gratings, which are arranged next to each other or stacked. Thereby, the respective deflection element thus comprises more than one deflection structure. Therein, each of the deflection structures can be formed angle-selective with respect to a different angle of incidence and/or wavelength-selective with respect to a different wavelength. This type of holographic grating is also referred to as multiplex volume holographic grating (briefly: MVHG).

In this context, it is provided in a further example of the invention that the first and the second deflection element each include an input coupling deflection structure for coupling the illumination light into the light guiding medium and an output coupling deflection structure for coupling the illumination light out of the light guiding medium. Therein, the input coupling deflection structure of the second deflection element and the output coupling deflection structure of the first deflection element are configured to deflect the illumination light at a predetermined first diffraction angle. In contrast, the input coupling deflection structure of the first deflection element and the output coupling deflection structure of the second deflection element are configured to deflect the illumination light at a predetermined second diffraction angle different from the first diffraction angle. The illumination device is arranged in the region of the input coupling deflection structure of the second deflection element. In contrast, the image capture device is arranged in the region of the output coupling deflection structure of the second deflection element.

Thus, the deflection structures are configured direction-selective with respect to different diffraction angles as previously explained in more detail. Hereby, the advantage arises that a superposition or interference of the illumination light and the reflected illumination light can be avoided in forwarding in the light guiding medium. In addition, there also arises the advantage that the above mentioned offset, thus the distance, which the illumination device and the image capture device have to each other, can be compensated for. Shadow casting by the illumination device on the object can thus be avoided.

Additionally or alternatively, a segmented recording of the environment by the camera apparatus is advantageously also possible. Therefore, different environmental regions, non-overlapping environmental regions, can be captured by a camera apparatus. Thereto, it is provided in a further example of the invention that the image capture device comprises an image sensor with at least two detection regions and the light guiding medium comprises an own deflection region for each of the detection regions. Therein, each of the deflection regions respectively includes, as previously described, the first and the second deflection element. Thus, each of the deflection regions is configured to capture an environmental region different at least in certain areas. Thereto, the respective deflection elements of a first deflection region include other deflection structures than for example the deflection elements of a second deflection region.

If the camera apparatus is for example employed in a vehicle such as for example a motor vehicle, thus, a roadway can for example be recorded with the first deflection region, while an adjacent pedestrian way can be monitored at the same time with a second deflection region.

An aspect of the invention also relates to a headlight arrangement for a motor vehicle including a headlight light source and the camera apparatus as it was previously described. Thus, the camera apparatus can be integrated in a present headlight of the motor vehicle. Therein, the light guiding medium is configured transparently, thus in particular of a transparent material. Thus, a glass plate or plastic plate can for example serve as the light guiding medium. Therein, the light guiding medium is arranged in front of the headlight light source in a radiation direction of the headlight light source such that the headlight light source is configured to provide a headlight light by the light through the light guiding medium between the first and the second object region. Therefore, the headlight of the motor vehicle can be used both for illuminating the roadway and for recording objects in the environment of the vehicle.

The motor vehicle is configured as a car, in particular as a passenger car or truck, or as a passenger bus or motorcycle.

The invention also includes the combinations of the features of the described examples.

BRIEF DESCRIPTION OF THE DRAWINGS

These and other aspects and advantages will become more apparent and more readily appreciated from the following description of exemplary embodiments, taken in conjunction with the accompanying drawings, wherein identical components are identified by identical reference signs. In the figures.

DETAILED DESCRIPTION

Figure 1:
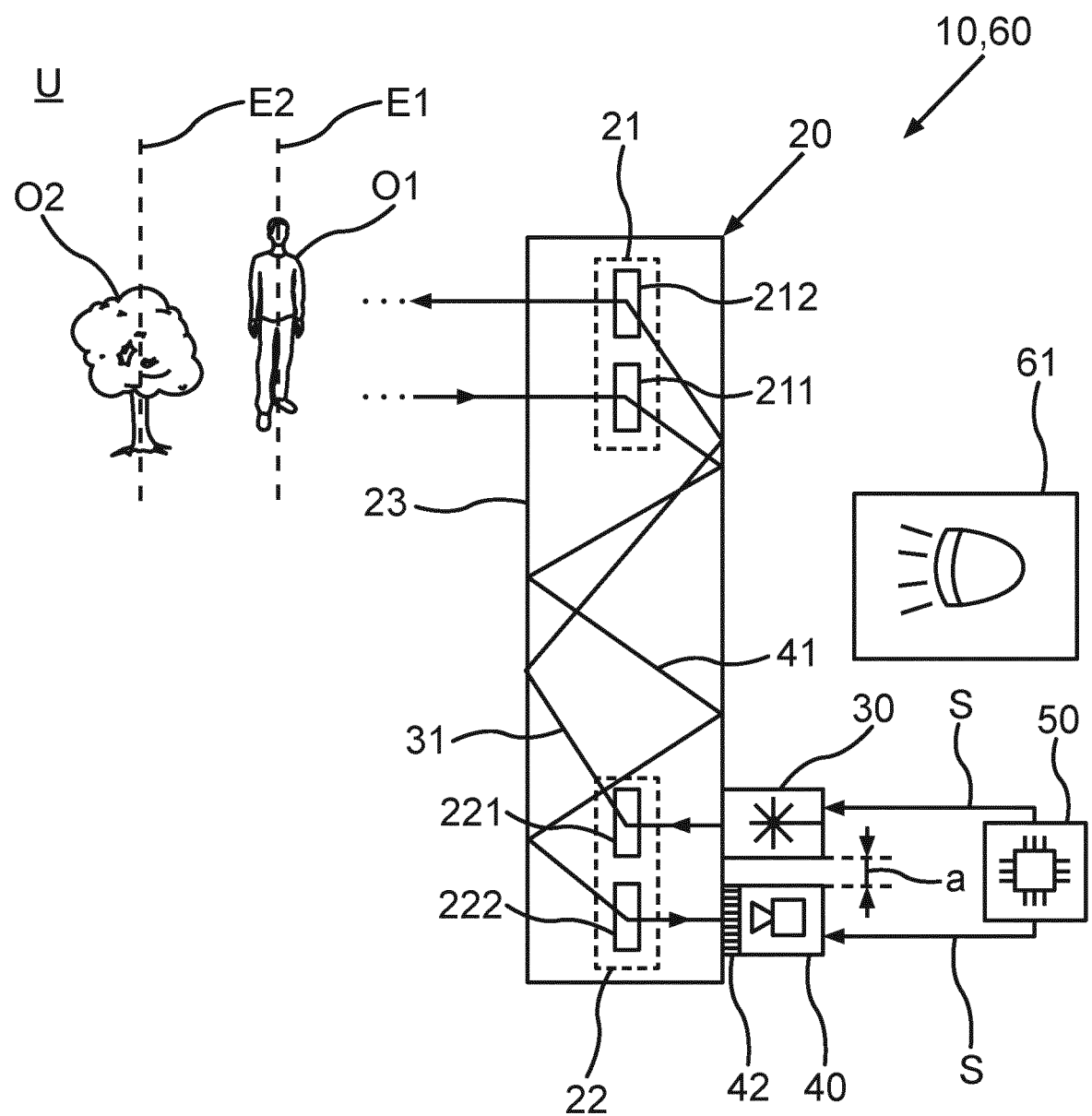
FIG. 1 a schematic representation of an example of a sectional image of a camera apparatus from a lateral perspective, by which only one object in an environment, which is situated in a predetermined object plane to the camera apparatus, can be captured.

In the examples, the described components of the examples each represent individual features of the invention to be considered independently of each other, which also each develop the invention independently of each other. Therefore, the disclosure is to include also combinations of the features of the examples different from the illustrated ones. Furthermore, the described examples can also be supplemented by further ones of the already described features of the invention.

In the figures, identical reference characters each denote functionally identical elements.

FIG. 1 shows an example of a schematic representation of a camera apparatus 10. Therein, the camera apparatus 10 is illustrated from a lateral perspective in a sectional view. Therein, only one or more objects in the environment U, which are situated in a predetermined object plane to the camera apparatus 10, are in particular to be recorded by the camera apparatus 10. Thus, these objects can be represented on a resulting image representation. An object or objects, which are situated in an object plane different from the predetermined one, are not to be recorded. In contrast, these objects are not represented on the resulting image representation. Therein, a respective plane in the environment is meant with object plane, which is arranged parallel to the camera apparatus in a recording direction of the camera apparatus 10.

In FIG. 1, two different objects O1 and O2 are exemplarily illustrated. The first object O1 is a person, who is situated in a first object plane E1 in the environment. The second object O2 is a tree, which is situated in a second object plane E2 in the environment. Therein, the first object plane E1 and thus also the first object O1 are closer to the camera apparatus 10 than the second object plane E2 and the second object O2.

Now, in order to be able to record the objects O1, O2 depending on their distance from the camera apparatus 10, which is determined by the respective object plane E1, E2, the camera apparatus 10 includes a redirection device 20, an illumination device 30, an image capture device 40 and a control device 50.

Presently, the illumination device 30 is exemplarily configured as a laser light source. It is the function of the illumination device 30 to provide illumination light 31, thus presently a laser light beam for illuminating the desired object O1, O2. The image capture device 40 is configured as a photo camera or video camera according to the example in FIG. 1. The image capture device 40 is configured to capture reflected illumination light 41, thus a portion of the provided illumination light 31, which is reflected on the respective object O1, O2 upon reflection of the illumination light 31. Thereto, the image capture device 40 can for example comprise an image sensor, for example a CMOS sensor or a CCD sensor. It can convert the captured illumination light 41 into a digital image signal in known manner, by which the image representation of the environment U is encoded.

As shown in FIG. 1, the camera apparatus 10 is configured as a "holocam". Thereby, the object O1, O2 to be recorded does not have to be situated in an optical axis with the illumination device 30 and/or the image capture device 40 anymore. Thus, the illumination device 30 and the image capture device 40 can be arranged offset to the respective object O1, O2 perpendicularly to the recording direction of the camera apparatus 10. Thereby, in particular in installation of the camera apparatus in a motor vehicle, advantages arise, which are again addressed in more detail in the later course.

In order to realize this offset, the above mentioned redirection device 20 is provided. The redirection device 20 presently includes a light guiding medium 30 configured as a glass plate or glass pane for forwarding or transferring light by internal reflection. Two deflection elements 21, 22 are incorporated in the light guiding medium 20 spaced from each other along a longitudinal extension direction. The function of the deflection elements is in redirecting the illumination light 31 provided by the illumination device 30 to the environment as well as redirecting the reflected illumination light 41 from the environment to the image capture device 40. Therein, the deflection structures are configured frequency-selective for a wavelength of the illumination light 31, 41. Thus, only the illumination light 31, 41 is redirected by the deflection elements. In contrast, environmental light, which is incident on the deflection structures 21, 22 from the environment U, is not deflected and can propagate through the light guiding medium 20 in particular in non-deflected manner.

In FIG. 1, the deflection elements 21, 22 are configured as holographic-optical elements, in particular as multiplex volume holographic gratings (multiplex volume holograms). Therefore, each of the deflection elements 21, 22 includes two different deflection structures, namely each one input coupling deflection structure 211, 221 and one output coupling deflection structure 212, 222.

For providing the illumination light 31, the illumination device 30 is directly attached to a first side of the light guiding medium 23 within a region configured by the input coupling deflection structure 221 of the second deflection element 22. For example, the illumination device 30 can be adhered to the light guiding medium. If the illumination light 31 now impinges on the input coupling deflection structure 221, the illumination light 31 is deflected towards the first deflection element 21 at a diffraction angle determined by a grating characteristic of the deflection structure 221 and thereby coupled into the light guiding medium 23. The light guiding medium 31 transfers the input coupled illumination light 31 now to the output coupling deflection structure 212 of the first deflection element 21 by internal total reflection. By the output coupling deflection structure 212, the illumination light 31 is now deflected into the environment U at a diffraction angle determined by a grating characteristic of the deflection structure 212 for illuminating the respective object O1, O2 and thus coupled out of the light guiding medium 23. If the illumination light 31 then impinges on an object O1, O2 in the environment U, the illumination light 31 or at least a portion of the illumination light is reflected and reflected to the first deflection element 21 in the form of the reflected illumination light 41. If the reflected illumination light 41 therein impinges on the input coupling deflection structure 211 of the first deflection element 21, the reflected illumination light 41, 31 is deflected towards the second deflection element 22 at a diffraction angle determined by a grating characteristic of the deflection structure 211 and thereby coupled into the light guiding medium 23. The light guiding medium 31 in turn transfers the input coupled reflected illumination light 41 to the output coupling deflection structure 222 of the second deflection element 22 by internal total reflection. By the output coupling deflection structure 222, the reflected illumination light 41 is finally deflected towards the image capture device 40 at a diffraction angle determined by a grating characteristic of the deflection structure 222 and thus coupled out of the light guiding medium 23. For capturing the reflected illumination light 41, the image capture device 40 is directly attached to the first side of the light guiding medium 23 within a region configured by the output coupling deflection structure 222 of the second deflection element 22. For example, the image capture device 40 can be adhered to the light guiding medium. As shown in FIG. 1, the illumination device 30 and the image capture device 40 are thereby arranged one above the other at a distance a to each other in longitudinal extension direction of the light guiding medium 23.

According to the example described in FIG. 1, the above mentioned grating characteristic of the input coupling deflection structure 221 therein corresponds to the grating characteristic of the output coupling deflection structure 212. This is in particular symbolized by the similar hatching in FIG. 1. Thus, the respective diffraction angles, at which the input coupling deflection structure 221 and the output coupling deflection structure 212 deflect the illumination light 31, also coincide. Analogously, the grating characteristic of the input coupling deflection structure 211 corresponds to the grating characteristic of the output coupling deflection structure 222. This is in particular symbolized by the similar hatching in FIG. 1. Thus, the respective diffraction angles, at which the input coupling deflection structure 211 and the output coupling deflection structure 222 deflect the reflected illumination light 41, also coincide. Accordingly, the input coupling deflection structure 221 and the output coupling deflection structure 212 are direction-selective with respect to different diffraction angles compared to the input coupling deflection structure 211 and the output coupling deflection structure 222. As shown in FIG. 1, it can thus be achieved that a beam path of the illumination light 31 within the light guiding medium 23 deviates from a beam path of the reflected illumination light 41. Thus, the illumination light 31 is differently often totally reflected at different locations on a respective interface of the light guiding medium 23 compared to the reflected illumination light 41. Superposition of the illumination light 31 and of the reflected illumination light 41 is thus prevented.

For capturing only one predetermined object O1, O2 in the environment U depending on object plane, the above mentioned control device 50 is finally provided. Presently, the control device 50 is exemplarily configured as a microcontroller. The control device 50 is now configured to operate the illumination device 30 and the image capture device in a predetermined switching operation. Therefore, the control device 50 can control the illumination device 30 for emitting the illumination light 31 in one or more light pulses with respectively a predetermined illumination interval. Furthermore, the control device 50 can additionally also control the image capture device 40 for capturing the reflected illumination light 41 only within one or more predetermined recording intervals, which are associated with a respectively preceding illumination interval. As shown in FIG. 1, therein, the image capture device includes an electrically switchable foil layer 42 for switching, which can be switched into a transparent or opaque state by the control device 50.

According to the switching operation, a respective illumination interval and a respectively associated recording interval follow one after the other in time. Thus, a respective pause interval is provided between a respective illumination interval and the associated recording interval. In the pause interval, therein, neither the illumination device 30 for providing the illumination light 31 nor the image capture device 40 for capturing the illumination light 41 is activated.

By operating the illumination device 30 and the image capture device 40 in the switching operation, thus, only the respectively desired object plane E1, E2 in the environment can be illuminated during a switching procedure, such that also only the illumination light 41 reflected on the respective object O1, O2 situated in the desired object plane E1, E2 is recorded. Therein, a sequence of exactly one illumination interval, followed by a pause interval and a final recording interval, is meant with switching procedure. The switching operation can in particular include one or more such switching procedures.

Which object plane E1, E2 in the environment U is therein illuminated and captured by the camera apparatus 10, in particular depends on the characteristics of the switching operation. Among other things, a light intensity of the illumination light 31, a light guiding characteristic of the light guiding medium 23 and the environment U, a duration of the illumination interval and of the recording interval and a duration of the associated pause interval are classed among the characteristics. The lower the light intensity, the longer for example the duration of the illumination interval and of the recording interval has to be selected to be able to provide reflected illumination light 41 with sufficient intensity to the image capture device 40. The longer the duration of the pause interval the farther away an object O1, O2 can be situated from the camera apparatus 10. Inversely, it of course also applies the shorter the duration of the pause interval, the closer the object O1, O2 has to be situated to the camera apparatus 10.

Thus, according to the example in FIG. 1, for example either the first object O1 or the second object O2 can be recorded (in a respective image representation) by the camera apparatus 10 in a switching procedure. Therein, which one of the objects O1, O2 is recorded, depends on the selection of the characteristics of the switching operation.

In contrast, if multiple switching procedures are provided according to the switching operation, a three-dimensional image representation of the environment U can for example also be generated. Thereto, the control device 50 is configured to increase or reduce the respective pause interval duration in a switching procedure with respect to the pause interval duration of a preceding switching procedure. Thereby, the reflected illumination light 41 can be captured from different object planes E1, E2, as previously described. The respectively resulting image representations can then for example be composed to the three-dimensional image representation by the control device 50. Thus, the recording of a three-dimensional image representation would alternatively of course also be possible, on which multiple objects O1, O2 from different object planes E1, E2 are depicted.

The previously described camera apparatus 10 can for example be installed in a motor vehicle. Therein, the camera apparatus 10 can for example be used for object recognition to recognize objects on a roadway, such that a protection function of the motor vehicle like emergency braking can for example be executed thereupon. In order to save installation space in the arrangement of the camera apparatus 10 in the motor vehicle, the camera apparatus 10 can for example be integrated in a headlight of the motor vehicle. Therein, the camera apparatus 10 can constitute a headlight arrangement 60 with a headlight light source 61 as shown in FIG. 1. Therein, the light guiding medium 23 is in particular configured transparent, for example as a transparent glass plate or polymer plate. Therein, the camera apparatus 10 is arranged in front of the headlight light source 61 with the light guiding medium 23 in radiation direction of the headlight light source 61. Therein, the headlight light source is in particular between the first deflection element 21 and the second deflection element 22. Thus, the headlight light source 61 can provide the headlight light through the light guiding medium 23 to the environment U in unimpeded manner to for example illuminate the roadway for a driver. Therein, the roadway can be captured at the same time for recognizing undesired objects by the camera apparatus 10. Therein, the illumination light 31 is provided with a wavelength in the infrared range by the illumination device 30. Thus, the capture of the environment U by the camera apparatus 10 can be effected invisible to the driver. The sight of the driver is thus not disturbed.

Figure 2:
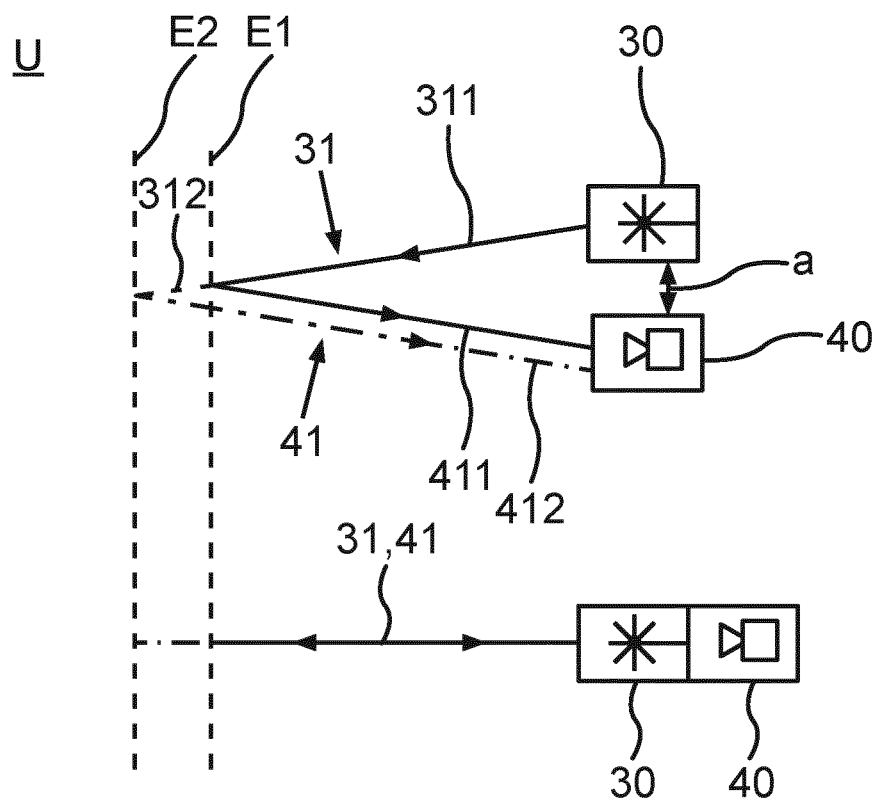
FIG. 2 a schematic representation of an example of two different camera apparatuses in comparison.

Based on FIG. 2, an advantage of the above mentioned redirection unit 20 of the camera apparatus 10 can finally be again described in more detail. Therein, FIG. 2 schematically shows an example of an effect on the recording characteristics of a camera apparatus for recording objects in an environment depending on object plane without and with the redirection unit 20.

Namely, without the redirection unit 20, as it is shown in the upper image in FIG. 2, the above mentioned distance a, which the illumination device 30 and image capture device 40 (solely caused by installation space) have to each other, cannot be compensated for. As a result, a first beam portion 311 of the illumination light 31 would be reflected on an object in the first object plane E1 and be reflected to the image capture device 40 as a first beam portion 411 of the reflected illumination light 41. In contrast, a second beam portion 312 of the illumination light 31 would be reflected on an object in the second object plane E2 and be reflected to the image capture device 40 as a second beam portion 412 of the reflected illumination light 41. Thus, of an emitted light beam of the illumination light 31, two or more light beams of reflected illumination light 41 would arrive at the image capture device 40. Thereby, undesired interference effects can occur on the resulting image representation. For example, overexposure and/or undesired shadow casting can be classed among the interference effects.

Such interference effects can be avoided by the employment of the redirection unit 20. Thus, a further function of the redirection unit is in compensating for the offset between the illumination device 30 and the image capture device 40 caused by the distance a. This function is in particular schematically illustrated in the lower image in FIG. 2. Therein, the above mentioned direction selectivity of the deflection structures 211, 212, 221, 222 is exploited. As previously described, in the direction selectivity, the respectively incident light is deflected at a predetermined diffraction angle determined by the respective grating characteristic. The diffraction angle is an angle between a respectively incident light beam and associated deflected light beam. However, the deflection structures 211, 212, 221, 222 are usually non-ideal systems such that rather a beam fan or conical beam bundle arises instead of a deflected light beam. Thus, the illumination light 31 and the reflected illumination light 41 are expanded within a predetermined cone angle or inclination angle upon each input and/or output coupling. The inclination angle is less than 5°, in particular less than 1°. By this expansion of the light, thus, the offset between illumination device 30 and image capture device 40 can be compensated for. Thus, FIG. 1 rather shows an idealized representation of the illumination light 31 and of the reflected illumination light 41 than individual light beams.

In the following, the advantages are again summarized, which arise by using the camera apparatus, as it was previously described. On the one hand, shadow casting on the resulting image representation can be avoided since the illumination of the object is quasi effected in an optical axis with the recording (also termed on-axis illumination in the following). In addition, a higher accuracy of the illumination and/or recording time window or interval arises, since an unknown geometric path length change does not arise in the progress of the (reflected) illumination light due to the on-axis illumination. Otherwise, the influence of an offset between illumination device and image capture device would be of increasing influence on the resulting image representation with increasing distance of the camera apparatus to the object to be recorded. Furthermore, by the use of HOEs, the advantage also arises that the desired wavelength of the illumination light can be narrower (smaller) and thus better configured (wavelength selectivity). Thereby, additional optical filters for filtering the wavelength either are not required in the camera apparatus such that cost and components and thus also additional interference effects (refractions and/or reflections) can be saved. Analogously, also narrower angle ranges and thus the angle ranges can be better configured due to the angle selectivity of HOEs. This function is usually not reproducible with classical optical components. Furthermore, a particularly flat construction of the camera apparatus is also possible, which results from the non-present or negligibly low extension of the HOE. Thus, a smaller and/or more lightweight package or housing can be realized for the camera apparatus. This is especially relevant in the automotive or automobile area. In that HOEs can be integrated in a transparent light guide, which thus only responds to the wavelength and/or the angle determined by the HOE, the advantage finally arises that the corresponding camera apparatus is for example employable in the automotive area at otherwise not possible locations, such as for example in the headlight area.

Overall, the examples show how a holocam for recording objects, which are situated in defined object planes to the holocam, can be provided.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A camera apparatus for generating at least one image representation of at least one object in an environment, comprising:
   a light guide, including a first deflection element and a second deflection element, to transfer light between the first and the second deflection element by internal reflection;
   an illumination device, to provide illumination light to illuminate the at least one object in the environment to the second deflection element, the second deflection element to couple the illumination light into the light guide to transfer the illumination light to the first deflection element and the first deflection element to couple the transferred illumination light out of the light guide to illuminate the object;
   an image capture device, upon reflection of the illumination light on the respective object, to capture the reflected illumination light and to generate the at least one image representation, wherein to provide the reflected illumination light to the image capture device, the first deflection element to couple the reflected illumination light into the light guide to transfer the reflected illumination light to the second deflection element, and the second deflection element to couple the transferred reflected illumination light out of the light guide to transfer the reflected illumination light to the image capture device; and
   a control device to operate the illumination device and the image capture device in a predetermined switching operation, wherein the illumination device and the image capture device have an activated state to provide the illumination light and to capture the reflected illumination light offset in time from each other in the switching operation.

2. The camera apparatus according to claim 1, wherein in the switching operation the control device to increase or reduce a pause interval between an activated state of the illumination device and an activated state of the image capture device according to a predetermined switching criterion with each switching procedure.

3. The camera apparatus according to claim 2, wherein the image capture device includes a mechanically movable closure element and/or an electrically switchable foil layer for switching between the activated state and a deactivated state.

4. The camera apparatus according to claim 2, wherein the illumination device and the image capture device are at a predetermined distance (a) to each other in a transfer region of the light guide formed by the second deflection element.

5. The camera apparatus according to claim 2, wherein the illumination device includes a laser light source to provide the illumination light.

6. The camera apparatus according to claim 2, wherein the illumination device is to generate illumination light in the infrared frequency range.

7. The camera apparatus according to claim 2, wherein the first and the second deflection elements include optical gratings including surface holographic gratings or volume holographic gratings.

8. The camera apparatus according to claim 1, wherein the image capture device includes a mechanically movable closure element and/or an electrically switchable foil layer for switching between the activated state and a deactivated state.

9. The camera apparatus according to claim 8, wherein the illumination device and the image capture device are at a predetermined distance (a) to each other in a transfer region of the light guide formed by the second deflection element.

10. The camera apparatus according to claim 8, wherein the illumination device includes a laser light source to provide the illumination light.

11. The camera apparatus according to claim 8, wherein the illumination device is to generate illumination light in the infrared frequency range.

12. The camera apparatus according to claim 1, wherein the illumination device and the image capture device are at a predetermined distance (a) to each other in a transfer region of the light guide formed by the second deflection element.

13. The camera apparatus according to claim 12, wherein the illumination device includes a laser light source to provide the illumination light.

14. The camera apparatus according to claim 1, wherein the illumination device includes a laser light source to provide the illumination light.

15. The camera apparatus according to claim 14, wherein the illumination device is to generate illumination light in the infrared frequency range.

16. The camera apparatus according to claim 1, wherein the illumination device is to generate illumination light in the infrared frequency range.

17. The camera apparatus according to claim 1, wherein the first and the second deflection elements include optical gratings including surface holographic gratings or volume holographic gratings.

18. The camera apparatus according to claim 1, wherein the first and the second deflection elements each include an input coupling deflection structure to couple the illumination light into the light guide and an output coupling deflection structure to couple the illumination light out of the light guide, and
   the input coupling deflection structure of the second deflection element and the output coupling deflection structure of the first deflection element to deflect the illumination light at a predetermined first diffraction angle, and
   the input coupling deflection structure of the first deflection element and the output coupling deflection structure of the second deflection element to deflect the reflected illumination light at a predetermined second diffraction angle different from the first diffraction angle.

19. The camera apparatus according to claim 1, wherein the image capture device comprises an image sensor with at least two detection regions and the light guide comprises an own deflection region with the first and the second deflection elements for each of the detection regions, wherein each of the deflection regions to capture an environmental region of the environment different at least in certain areas.

20. A headlight system for a motor vehicle, the headlight system comprising:
a headlight light source; and
a camera apparatus according to claim 1, wherein the light guide is transparent and is in front of the headlight light source in a radiation direction of the headlight light source such that the headlight light source is configured to provide a headlight light through the light guide between the first and the second deflection elements.

* * * * *

UNITED STATES PATENT AND TRADEMARK OFFICE
CERTIFICATE OF CORRECTION

| | |
|---|---|
| PATENT NO. | : 12,055,840 B2 |
| APPLICATION NO. | : 17/926039 |
| DATED | : August 6, 2024 |
| INVENTOR(S) | : Tobias Moll et al. |

It is certified that error appears in the above-identified patent and that said Letters Patent is hereby corrected as shown below:

On the Title Page

Item (22), delete "Apr. 20, 2021" and insert --Apr. 22, 2021--.

Item (57), Abstract after "device" delete "(".

In the Claims

Column 15, Line 56:
In Claim 2, after "operation" insert --of--.

Signed and Sealed this
Twenty-ninth Day of October, 2024

*Katherine Kelly Vidal*
Katherine Kelly Vidal
*Director of the United States Patent and Trademark Office*